(12) United States Patent
Tremelling

(10) Patent No.: US 9,667,109 B2
(45) Date of Patent: May 30, 2017

(54) PERMANENT MAGNET ELECTRICAL MACHINE ROTORS WITH STACKED ANNULAR MAGNETS AND RETAINERS AND CONSTRUCTION METHODS THEREFOR

(75) Inventor: Darren Dale Tremelling, Cary, NC (US)

(73) Assignee: ABB Research Ltd., Zurich (CH)

( * ) Notice: Subject to any disclaimer, the term of this patent is extended or adjusted under 35 U.S.C. 154(b) by 1394 days.

(21) Appl. No.: 13/419,898

(22) Filed: Mar. 14, 2012

(65) Prior Publication Data

US 2013/0062984 A1 Mar. 14, 2013

Related U.S. Application Data

(60) Provisional application No. 61/470,397, filed on Mar. 31, 2011.

(51) Int. Cl.
| | | |
|---|---|---|
| *H02K 1/27* | (2006.01) | |
| *H02K 1/12* | (2006.01) | |
| *H02K 1/30* | (2006.01) | |
| *H02K 1/28* | (2006.01) | |

(52) U.S. Cl.
CPC ............ *H02K 1/2733* (2013.01); *H02K 1/12* (2013.01); *H02K 1/28* (2013.01); *H02K 1/30* (2013.01)

(58) Field of Classification Search
CPC .......... H02K 1/2733; H02K 1/27; H02K 1/30; H02K 1/28; H02K 1/20; H02K 2201/12
USPC ... 310/60 A, 156.08, 156.12, 156.19, 156.28
See application file for complete search history.

(56) References Cited

U.S. PATENT DOCUMENTS

| | | | |
|---|---|---|---|
| 3,434,709 A | 3/1969 | Ramsay | |
| 4,534,116 A | 8/1985 | Davis | |
| 4,667,123 A | 5/1987 | Denk | |
| 4,767,125 A | 8/1988 | Barry | |
| 4,930,201 A | 6/1990 | Brown | |
| 5,111,094 A | 5/1992 | Patel | |
| 5,285,699 A | 2/1994 | Walls | |
| 5,942,828 A * | 8/1999 | Hill | 310/164 |
| 6,047,461 A | 4/2000 | Miura | |
| 6,141,856 A * | 11/2000 | Johnson et al. | 29/598 |
| 6,229,238 B1 * | 5/2001 | Graef | 310/164 |
| 6,452,301 B1 | 9/2002 | Van Dine | |

(Continued)

FOREIGN PATENT DOCUMENTS

| | | |
|---|---|---|
| EP | 2091131 | 8/2009 |
| GB | 2299217 | 9/1996 |

(Continued)

OTHER PUBLICATIONS

Machine Translation of abstract of SU 1697208 A1.*
PTO 15-1882, Rotor of a High-Speed Electrical Machine, Translation of SU 1697208 A1.*
Konrad Weeber, "Advanced Electric Machines Technology," Workshop on Future Large CO2 Compression Systems, Mar. 30-31, 2009.

(Continued)

*Primary Examiner* — Burton Mullins
(74) *Attorney, Agent, or Firm* — Taft Stettinius & Hollister LLP

(57) ABSTRACT

Permanent magnet electrical machine rotors and construction methods can include at least one magnet and at least one retention element. An axial relative force maintained between one or more magnets and one or more retention elements can urge the retention element along one or more magnet surfaces to induce a hoop stress in the retention elements and a compressive stress within the magnets.

18 Claims, 3 Drawing Sheets

(56) References Cited

U.S. PATENT DOCUMENTS

| | | | |
|---|---|---|---|
| 6,700,288 B2 * | 3/2004 | Smith | H02K 21/14 |
| | | | 310/156.38 |
| 6,703,741 B1 | 3/2004 | Ifrim | |
| 6,750,584 B2 | 6/2004 | Smith | |
| 6,796,739 B1 | 9/2004 | Shoykhet | |
| 7,205,695 B2 | 4/2007 | Smith | |
| 7,358,637 B2 | 4/2008 | Tapper | |
| 7,619,332 B2 * | 11/2009 | Kimura | F03D 9/002 |
| | | | 290/55 |
| 7,692,348 B2 | 4/2010 | Gruenhagen | |
| 2005/0099079 A1 | 5/2005 | McMullen | |
| 2006/0255679 A1 | 11/2006 | Dine | |
| 2008/0093945 A1 | 4/2008 | Gruenhagen | |
| 2008/0238234 A1 | 10/2008 | Saban | |
| 2009/0021094 A1 | 1/2009 | Takimoto | |
| 2010/0019600 A1 | 1/2010 | Saban | |

FOREIGN PATENT DOCUMENTS

| | | | | |
|---|---|---|---|---|
| JP | 61073559 | | 4/1986 | |
| JP | 61207162 | | 9/1986 | |
| JP | 3273841 | | 12/1991 | |
| JP | 4165934 | | 6/1992 | |
| JP | 7046780 | | 2/1995 | |
| JP | 8265997 | | 10/1996 | |
| JP | 10023694 | | 1/1998 | |
| JP | 10210690 | | 8/1998 | |
| JP | 10225032 | | 8/1998 | |
| JP | 2001078378 | | 3/2001 | |
| JP | 2001086677 | | 3/2001 | |
| JP | 2000134839 | | 7/2005 | |
| JP | 2008219965 | | 9/2008 | |
| SU | 1697208 | A1 * | 12/1991 | H02K 21/28 |
| WO | 2006112806 | | 10/2006 | |
| WO | 2009146189 | | 12/2009 | |
| WO | 2011012133 | A2 | 2/2011 | |
| WO | 2011012133 | A3 | 2/2011 | |

OTHER PUBLICATIONS

James S. Smith and Andrew P. Watson, "Design, Manufacture, and Testing of a High Speed 10MW Permanent Magnet Motor and Discussion of Potential Applications," Proceedings of the Thirty-Fifth Turbomachinery Symposium, 2006, pp. 19-24.

Manoj R. Shah and Ayman M. El-Refaie, "Eddy Current Loss Minimization in Conducting Sleeves of High Speed Machine Rotors by Optimal Axial Segmentation and Copper Cladding," Industry Applications Conference, 42nd IAS Annual Meeting Conference of the 2007 IEEE, New Orleans, Louisiana, Sep. 23-27, 2007.

Daniel M. Saban, Cassandra Bailey, Klaus Brun and Delvis Gonzalez-Lopez, "Beyond IEEE Std 115 & API 546: Test Procedures for High-Speed, Multi-Megawatt Permanent-Magnet Synchronous Machines," Industry Applications Society 56th Annual Petroleum and Chemical Industry Conference, PCIC 2009, Sep. 14-16, 2009.

Cassandra Bailey, Daniel Saban and Paulo Guedes-Pinto, "Design of High-Speed Direct-Connected Permanent-Magnet Motors and Generators for the Petrochemical Industry," IEEE Transactions on Industry Applications, vol. 45, No. 3, pp. 1159-1165, May/Jun. 2009.

Vasileios Lelos, Steve Manifold and John Granier, "Structural Properties and Testing of a Composite Banding Used in High-Speed Rotors," IEEE Transactions on Magnetics, vol. 43, No. 1, pp. 250-253, Jan. 2007.

Andreas Binder, Tobias Schneider and Markus Klohr, "Fixation of Buried and Surface-Mounted Magnets in High-Speed Permanent-Magnet Synchronous Machines," IEEE Transactions on Industry Applications, vol. 42, No. 4, Jul./Aug. 2006, pp. 1031-1037.

Jason D. Ede, Z. Q. Zhu and David Howe, "Rotor Resonances of High-Speed Permanent-Magnet Brushless Machines," IEEE Transactions On Industry Applications, vol. 38, No. 6, Nov./Dec. 2002, pp. 1542-1548.

U.S. Appl. No. 13/613,674.

* cited by examiner

PERMANENT MAGNET ELECTRICAL MACHINE ROTORS WITH STACKED ANNULAR MAGNETS AND RETAINERS AND CONSTRUCTION METHODS THEREFOR

CROSS REFERENCE TO RELATED APPLICATION(S)

This application claims the benefit of and priority to U.S. Provisional Patent Application Ser. No. 61/470,397, which was filed on Mar. 31, 2011 and is entitled "Permanent Magnet Electrical Machine Rotors and Construction Methods Therefor." The complete disclosure of the above-identified patent application is hereby incorporated by reference for all purposes.

FIELD OF THE DISCLOSURE

The present disclosure relates to permanent magnet electrical machines, and more particularly to permanent magnet electrical machine rotors and construction methods therefor.

BACKGROUND

Permanent magnet electrical machine rotors, such as the rotors for permanent magnet electrical machines and, more particularly, high speed and/or power electrical machines, may be designed to mechanically restrain the magnets against the centrifugal forces present during operation of the electrical machine and/or to manage thermal stresses. Examples of permanent magnet electrical machine rotors are disclosed in U.S. Pat. Nos. 5,111,094 and 6,047,461; in UK Patent Application Publication No. GB2299217A; and in Japan Published Unexamined Patent Application No. JP10-225032A. The disclosures of these and all other publications referenced herein are incorporated by reference in their entirety for all purposes.

SUMMARY

In some examples, permanent magnet electrical machine rotors may include first and second magnets and a retention element. The first magnet may have a first surface. The second magnet may have a second surface. The retention element may have third and fourth surfaces. An axial relative force maintained between the first and second magnets may urge the third and fourth surfaces along respective ones of the first and second surfaces to induce a hoop stress in the retention element and a compressive stress within the first and second magnets.

In some examples, permanent magnet electrical machine rotors may include at least one magnet, at least two retention elements, and a pair of opposed end members. The at least one magnet may include a pair of opposed engaging surfaces. Each of the retention elements may be engaged with one of the opposed engaging surfaces of the at least one magnet. The pair of opposed end members may be configured to maintain an axial force between the at least one magnet and the at least two retention elements. The axial force may urge each of the retention elements along the one of the opposed engaging surfaces to induce a hoop stress in each of the retention elements and a compressive stress within the at least one magnet.

In some examples, methods for constructing permanent magnet electrical machine rotors may include arranging a plurality of magnets and retention elements along an axis and axially compressing the plurality of magnets and retention elements. At least some of the plurality of retention elements may be disposed at least partially between adjacent ones of the plurality of magnets. Axially compressing the plurality of magnets and retention elements may induce a hoop stress in each of the retention elements and a compressive stress within each of the magnets.

DETAILED DESCRIPTION

Figure 1:
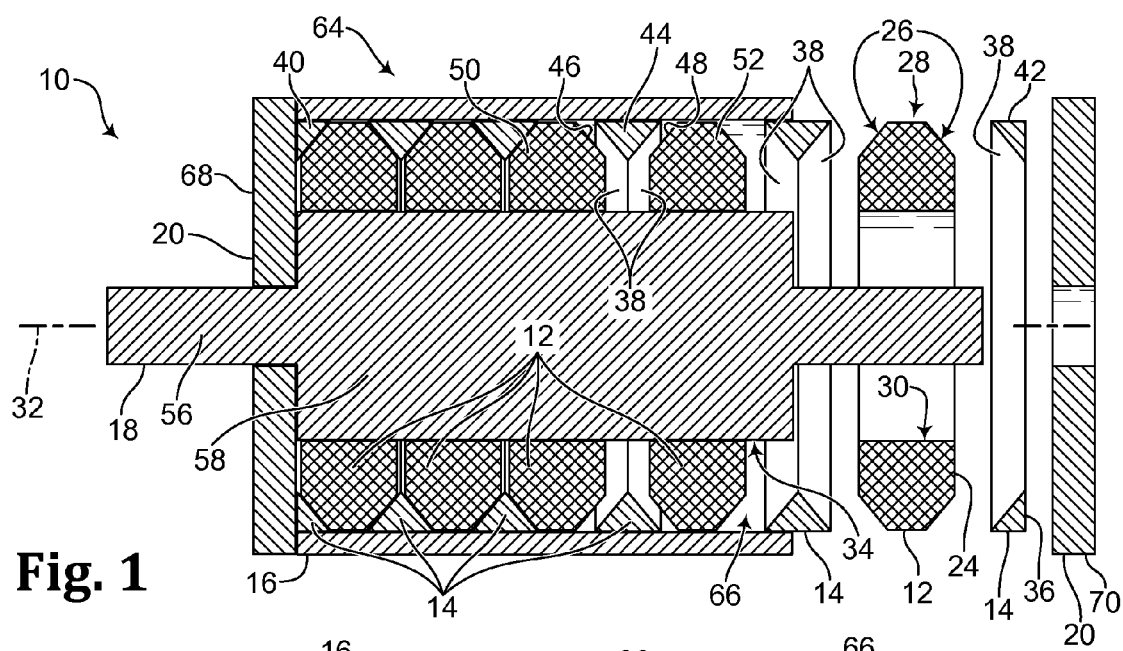
FIG. 1 is a longitudinal axial section view of a nonexclusive illustrative example of a permanent magnet electrical machine rotor, showing the arrangement of the magnets and retention elements.
Figure 2:
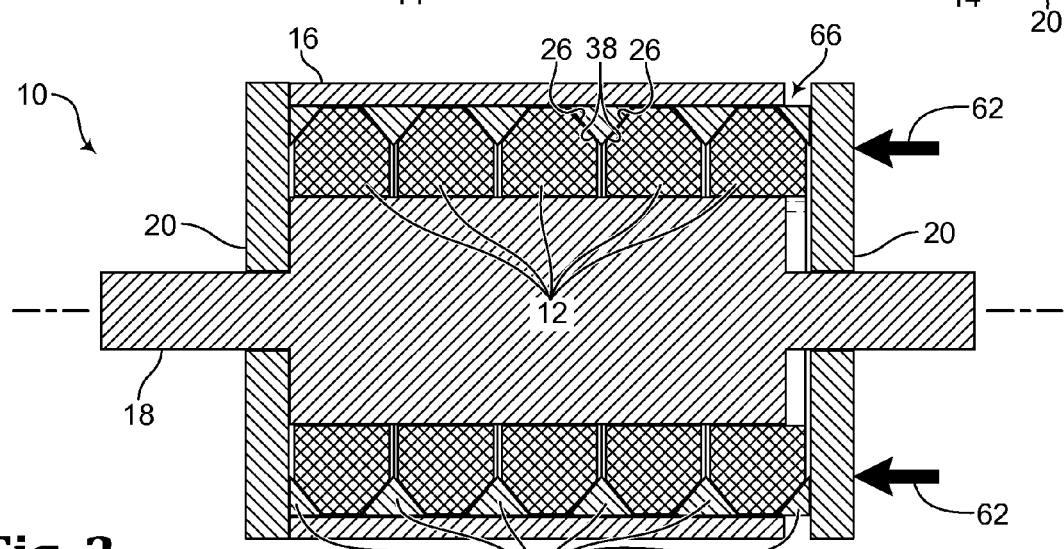
FIG. 2 is a longitudinal axial section view of the electrical machine rotor of FIG. 1, shown with the magnets and retention elements arranged before being axially compressed.
Figure 3:
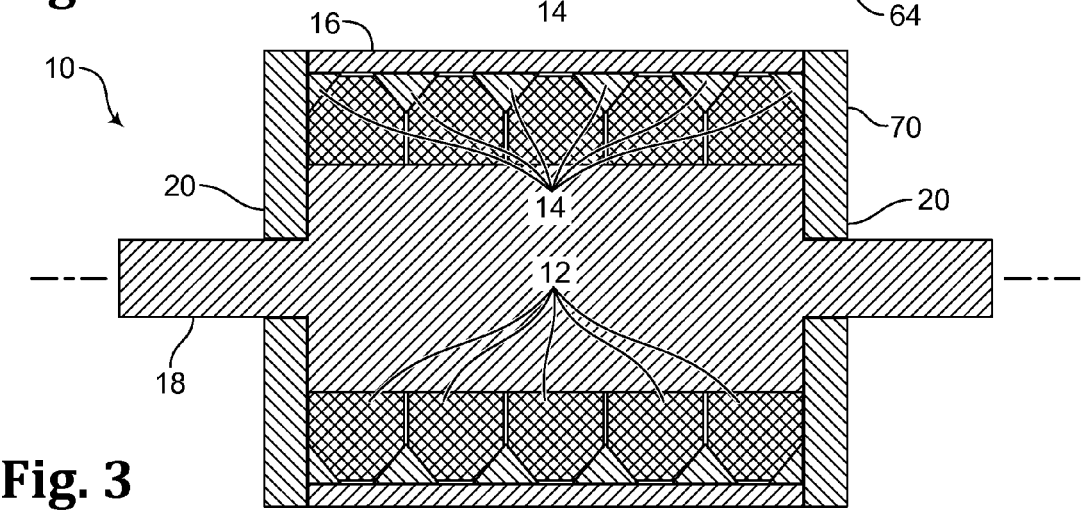
FIG. 3 is a longitudinal axial section view of the electrical machine rotor of FIG. 1, shown assembled.

A nonexclusive illustrative example of a permanent magnet electrical machine rotor is shown generally at 10 in FIGS. 1-3. Unless otherwise specified, the permanent magnet electrical machine rotor 10 may, but is not required to, contain at least one of the structures, components, functionalities, and/or variations described, illustrated, and/or incorporated herein. The rotor 10 may include at least one magnet 12, a plurality of retention elements 14, a sleeve 16, a shaft 18, and a pair of opposed end members 20.

In some examples, at least some of the magnets 12 may comprise a single, substantially integral or unitary ring- or hoop-shaped body 24, as generally shown in FIG. 1. However, in some examples, at least some of the magnets 12 may comprise a number of separate or discrete segments that may be assembled into the hoop-shaped body 24.

The magnets may be fabricated from any suitable material, such as a suitable permanent magnet material like neodymium, samarium cobalt, or other high energy product magnetic materials. Samarium cobalt may be used to provide or improve performance at elevated temperatures. When the magnets include a number of separate or discrete segments, some of the segments may be fabricated from permanent magnet material while others of the segments may be fabricated from another suitable material, which may be non-magnetic. Nonexclusive illustrative examples of suitable non-magnetic material may include those having at least some mechanical properties, such as density, that are relatively similar to the mechanical properties of the permanent magnet material.

Each of the magnets 12 may include at least one engaging surface 26, which may be proximate an outer or peripheral region of the magnet and/or the or hoop-shaped body. For example, as shown in FIG. 1, each of the magnets 12 includes a pair of opposed engaging surfaces 26 that are proximate a peripheral region 28 of the magnet.

The engaging surfaces may extend along or around any suitable portion of the peripheral region of the magnet and/or the or hoop-shaped body. For example, as shown in FIG. 1, the engaging surfaces 26 may extend substantially completely around the peripheral region 28 of the hoop-shaped bodies 24 of the magnets. However, in some examples, such as where the magnets comprise a number of segments, the engaging surfaces 26 may extend around less than the entire peripheral region, such as where the engaging surfaces are intermittently disposed around the circumference of the peripheral region.

Each of the engaging surfaces 26 may have any suitable shape, profile or configuration. For example, the engaging surfaces may be at least partially, or even completely, frustoconical. Thus, as shown in FIG. 1, the engaging surfaces 26 of the magnets 12 may be opposed, frustoconical outer surfaces on the magnets.

As shown in FIG. 1, at least some of the magnets 12 may include an inner surface 30, which may be disposed a substantially constant distance from an axis 32 of the rotor 10, such as where the inner surface is non-tapering or substantially cylindrical. In some examples, the inner surfaces 30 of the magnets and/or the outer surface 34 of the shaft 18 may be configured to impede or prevent relative rotation between the magnets 12 and the shaft 18. For example, the inner surfaces 30 and/or the outer surface 34 may include at least one substantially axially extending feature, such as facets, ridges, grooves or the like, that may tend to rotationally lock the magnets to the shaft.

Each of the retention elements 14 may comprise a single, substantially integral or unitary ring- or hoop-shaped body 36, as shown in FIG. 1. However, in some examples, the retention elements 14 may comprise a number of separate or discrete segments that may, in some examples, be assembled or combined to form a ring extending around the axis 32.

The retention elements may be fabricated from any suitable material, including metals, ceramics, composites, or the like. As may be understood, use of metal retention elements may provide or improve performance at elevated temperatures, while fiber-based composites, such as carbon or other fiber reinforced plastic materials, may be use in applications where a high tensile strength or reduced expansion under load may be desirable. In some examples, the retention elements may be fabricated from composite materials, such as a fiber reinforced plastic, that are selected due to their low thermal conductivity, which may at least partially thermally insulate the magnets from the sleeve, which may allow for a reduction in magnet temperature. When the retention elements are fabricated from a fiber-based composite material, any suitable manufacturing method may be used, such as filament or tape winding.

As may be seen in FIGS. 1-3, each of the retention elements 14 may be engaged with one of the engaging surfaces 26 of at least one of the magnets 12. Thus, each of the retention elements 14 may include at least one inner surface 38 configured to engage one of the engaging surfaces 26 on one of the magnets 12. The inner surface 38 may have any suitable shape, profile or configuration suitable to be engaged with or against one of the engaging surfaces 26 of at least one of the magnets 12. For example, as shown in FIG. 1, the inner surfaces 38 on the retention elements 14 may be at least partially frustoconical, which may provide a generally wedge-shaped profile for engaging the engaging surfaces of the magnets.

Although some of the retention elements 14, such as the retention elements 40, 42 proximate the ends of the rotor, may engage one of the engaging surfaces 26 on a single of the magnets 12, some of the retention elements 14 may be engaged with one of the engaging surfaces 26 on each of two adjacent ones of the plurality of magnets. By way of example, the retention element 44 shown in FIG. 1 includes a pair of opposed inner surfaces 38, either or both of which may be at least partially frustoconical, and each of which is configured to engage one of the engaging surfaces 46, 48 on one of a pair of adjacent ones 50, 52 of the magnets 14.

The rotor 10 may have any suitable combination of numbers of magnets 12 and retention elements 14. For example, the rotor may include N magnets 12, where N is an integer, and N+1 retention elements. Thus, a rotor having N magnets and N+1 retention elements may include 1, 2, 3, 4, 5, or even 6 or more, magnets and 2, 3, 4, 5, 6, or even 7 or more retention elements.

When present, the sleeve 16 may be disposed circumferentially around at least some of the plurality of magnets 12 and at least some of the plurality of retention elements 14. The sleeve 16 may be fabricated from any suitable material such as a metal and/or a composite material, such as a fiber-reinforced plastic, which may be tape or filament wound and/or otherwise laid-up. In examples where hermetic operation of an electrical machine comprising the rotor 10 may be desirable, a metal sleeve 16 may be used.

The shaft 18 may include the rotor's shaft 56 itself, along with any back-iron 58 that may be present in the rotor 10. When the shaft 18 is present, as shown in FIG. 1, the magnets 12 and/or the retention elements 14 may comprise and/or form hoop-shaped bodies 24, 36 disposed around the shaft 18, with the plurality of magnets 12 being disposed along the shaft 18.

An axial force supported or maintained between the plurality of magnets 12 and the plurality of retention elements 14 may urge one of the retention elements along one of the engaging surfaces 26 of each of the magnets to induce a tensile circumferential or hoop stress in each of the retention elements and a compressive stress within each of the magnets, while restraining the magnets against centrifugal forces and retaining the magnets against the shaft 18. By way of example and with reference to FIG. 2, an axial force, as suggested by the arrows 62, would tend to urge the frustoconical inner surfaces 38 of the retention elements 14 along the corresponding frustoconical engaging surfaces 26 of the adjacent ones of the magnets 12, which would tend to expand the retention elements while compressing the magnets.

In some examples where the rotor 10 includes a sleeve 16, both the sleeve 16 and the retention elements 14 may experience the hoop stress corresponding to the compressive stress induced in the magnets 12. However, in some examples, the retention elements and sleeve may be suitably configured such that the retention elements bear a larger portion of the hoop stress, or even substantially all of the hoop stress, which may permit a relatively thinner and/or lighter sleeve. As may be understood, a thinner or lighter sleeve may reduce sleeve losses, reduce temperature rises within the rotor, and/or may enhance flux density within the airgap.

The pair of opposed end members 20 may be configured to at least partially support or maintain the axial force between the magnets 12 and the retention elements 14. To maintain the axial force between the magnets and the retention elements, the end members 20 may be axially secured relative to the shaft 18 and/or the sleeve 16 using any suitable method or mechanism. Nonexclusive illustrative examples of such suitable methods and mechanisms include welding, adhesive bonding, bolting, threaded engagement, staking, pinning, and various other mechanical fastening methods.

In some examples, such as where the inner surfaces 38 of the retention elements 14 or the engaging surfaces 26 of the magnets 12 are suitably configured, wedging or frictional forces between the inner surfaces of the retention elements and the engaging surfaces of the magnets may at least partially restrain the retention elements relative to the magnets, which may at least partially support and/or maintain the axial force between the plurality of magnets 12 and the plurality of retention elements 14. By way of a nonexclusive illustrative examples, suitably angled frustoconical inner surfaces 38 on the retention elements 14, suitably angled frustoconical engaging surfaces 26 on the magnets 12, and/or suitable texturing or surface conditions on the inner surfaces 38 and/or the engaging surfaces 26 may provide an at least partially friction- or wedge-based engagement and/or restraint between the retention elements and the magnets.

As may be understood, a suitably configured wedge-based engagement between the retention elements and the magnets may permit higher and/or more uniform, accurate and/or predictable compressive pre-stressing within the magnets as compared to the pre-stresses that may be achieved by press- or shrink-fitting a sleeve to the rotor or by fiber-wrapping the magnets.

The compressive stresses or pre-stresses that may be induced within the magnets of the rotor during assembly may permit operation of the rotor at higher peripheral speeds, such as, for example, peripheral speeds in excess of about 150 meters per second (m/s) or even in excess of about 200 m/s. The ability to operate at higher peripheral speeds may permit operation at higher rotational speeds or revolutions per minute (RPM) for a rotor of a given radius, or may permit an increase in rotor radius for operation at a given rotational speed.

The following paragraphs describe a nonexclusive illustrative example of a method for assembling or constructing an electrical machine rotor, with reference to the rotor 10 shown in FIGS. 1-3. Although the actions of the following method may be performed in the order in which they are presented below, it is within the scope of this disclosure for the actions, either alone or in various combinations, to be performed before and/or after any of the other actions. A method for constructing an electrical machine rotor may include arranging a plurality of magnets 12 and a plurality of retention elements 14 into a lamination stack 64 along the axis 32, such as within the cavity or space 66 between the shaft 18 and the sleeve 16, with at least some of the plurality of retention elements disposed at least partially between adjacent ones of the plurality of magnets, as is generally shown in FIGS. 1 and 2. As shown in FIG. 2, the uncompressed lamination stack 64 may be longer than the sleeve 16.

In some examples, a pair of opposed end members 20 may also be arranged along the axis 32 and around the shaft 18. As suggested in FIG. 1, a first one 68 of the end members 20 may be secured to the shaft 18 and/or the sleeve 16 prior to arranging the magnets and retention elements within the space 66. The magnets and retention elements may be axially compressed from the condition shown in FIG. 2 to the condition shown in FIG. 3, such as by axial forces as suggested by the arrows 62 in FIG. 2. Such axial compression of the magnets 12 and retention elements 14 may urge at least some of the retention elements along the corresponding engaging surfaces of at least some of the magnets, which may induce a hoop stress in the retention elements, expand at least some of the retention elements toward the sleeve, induce a compressive stress within the magnets, and/or seat at least some of the magnets against the shaft. The axial compression of the magnets and retention elements may be maintained by securing the second one 70 of the end members 20 to the shaft 18 and/or the sleeve 16, as suggested in FIG. 3.

Depending on the desired contribution of the shell 16 to the hoop stress, the magnets 12 and/or the retention elements 14 may be a relatively loose or even a slip-fit within the sleeve 16 when the magnets and retention elements are being arranged along the axis 32 and/or around the shaft 18. As may be understood, a relatively loose or a slip-fit of the magnets and retention elements within the sleeve during arrangement may ease assembly and/or reduce the risk of damage to the magnets and/or the sleeve as compared to press-fitting the magnets within the sleeve or shrink-fitting the sleeve over the magnets.

Figure 4:
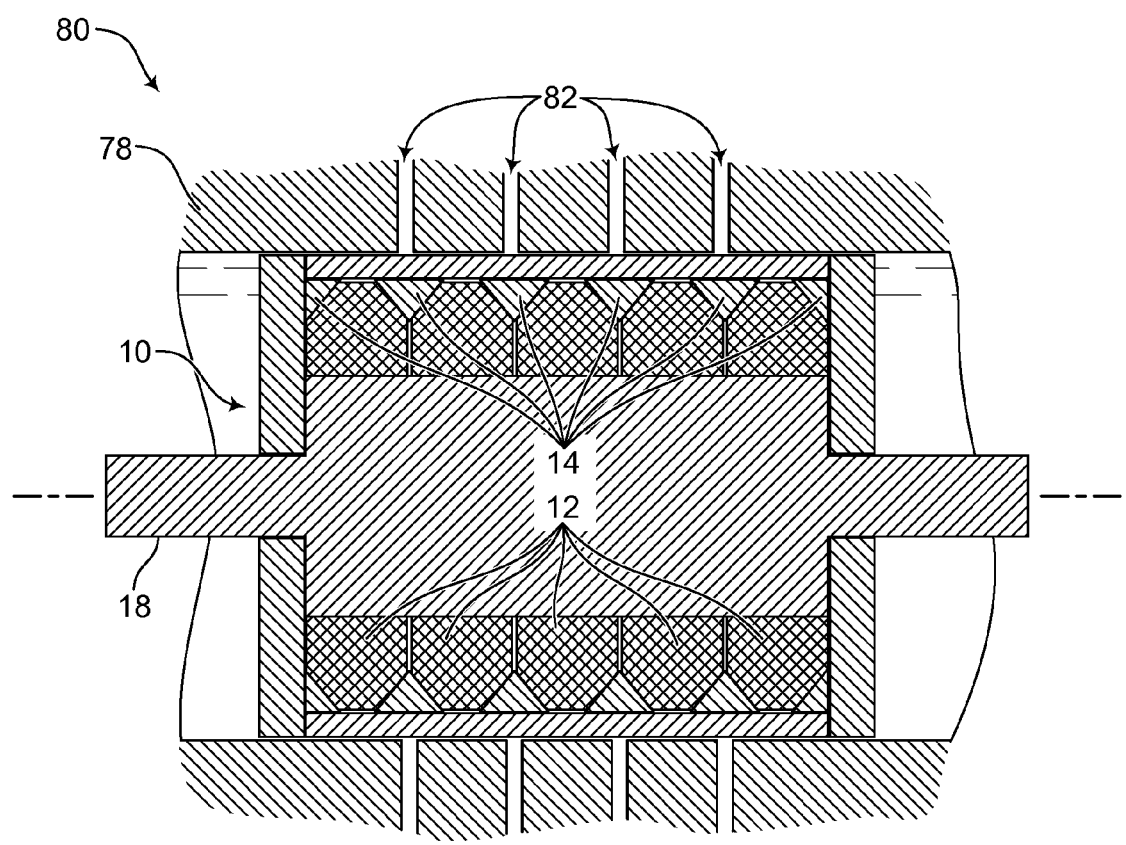
FIG. 4 is a longitudinal axial section view of a nonexclusive illustrative example of a permanent magnet electrical machine that includes the electrical machine rotor of FIGS. 1-3.

The rotor 10 and a suitable stator 78 may be assembled into a permanent magnet electrical machine, such as the nonexclusive illustrative example shown generally at 80 in FIG. 4. Unless otherwise specified, the electrical machine 80 may, but is not required to, contain at least one of the structures, components, functionalities, and/or variations described, illustrated, and/or incorporated herein. In some examples, the electrical machine 80 may be a high-speed permanent magnet synchronous machine.

In some examples, the stator 78 may include one or more stator ducts, which are schematically shown at 82 in FIG. 4. As generally shown in FIG. 4, the magnets 12 may be sized such that the retention elements 14 may be axially aligned with and/or placed under or proximate the stator ducts 82 when the rotor and electrical machine are assembled. Locating the retention elements proximate the stator ducts may reduce or even eliminate variation in flux density along the lamination stack.

Figure 5:
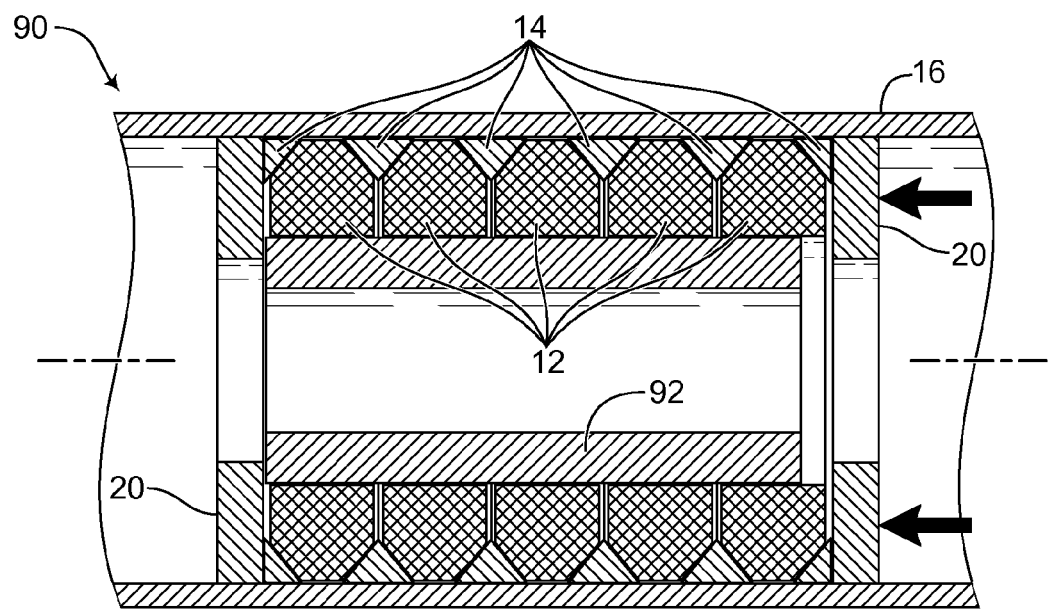
FIG. 5 is a longitudinal section view of another nonexclusive illustrative example of a permanent magnet electrical machine rotor, shown with the magnets and retention elements arranged before being axially compressed
Figure 6:
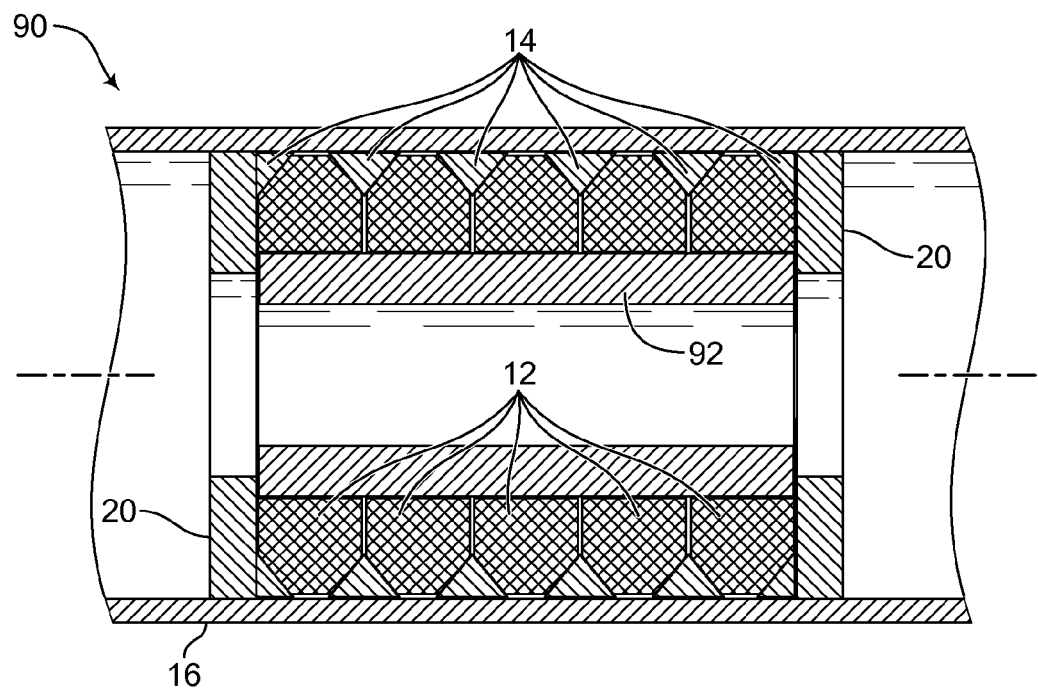
FIG. 6 is a longitudinal axial section view of the electrical machine rotor of FIG. 5, shown assembled.

Another nonexclusive illustrative example of a permanent magnet electrical machine rotor is shown generally at 90 in FIGS. 5 and 6. Unless otherwise specified, the permanent magnet electrical machine rotor 90 may, but is not required to, contain at least one of the structures, components, functionalities, and/or variations described, illustrated, and/or incorporated herein. The electrical machine rotor 90 may include a plurality of magnets 12, a plurality of retention elements 14, a sleeve 16, and a pair of opposed end members 20.

As shown in FIGS. 5 and 6, the rotor 90 lacks a central shaft; instead, including an extended sleeve 16 that may function as an electrical machine shaft. Use of an extended sleeve 16 as an electrical machine shaft, such as when the sleeve is fabricated from a fiber-reinforced composite material, and/or the elimination of a central shaft may reduce the mass and weight of the rotor 90 and/or may provide a stiffer rotor and/or shaft for the electrical machine. As may be understood, the increased stiffness resulting from using the sleeve 16 of the rotor 90 as an electrical machine shaft and/or the reduced rotor mass may increase the first critical rotational speed for the rotor 90, which may permit operation of the electrical machine at higher speeds. Furthermore, when used with magnetic shaft bearings, the increased shaft diameter that may result from using the extended sleeve 16 as a shaft may permit larger diameter magnetic bearings, which can support a given weight rotor using an axially shorter magnetic bearing.

The rotor 90 may generally be assembled or constructed using the method set out above with respect to the rotor 10. In some examples, the peripheral regions of the magnets 12, the outer surfaces of the retention elements and/or the inner surface of the sleeve 16 may be configured to impede or prevent relative rotation between the magnets 12 and the sleeve 16.

In some examples, the rotor 90 may include an inner cylinder 92, as shown in FIGS. 5 and 6. The inner cylinder 92 may comprise a single hollow cylinder, which may axially extend within a substantial portion of the length of the lamination stack of the magnets 12. However, in some examples, the inner cylinder may comprise a plurality of shorter cylinders that are stacked to axially extend within a substantial portion of the lamination stack. The inner cylinder, which may be fabricated from a ferromagnetic material, may carry at least a portion of the magnetic flux between poles of the magnets 12. However, in some examples, such as with relatively smaller diameter rotors, the magnets may be configured as a Halbach array or cylinder, and the rotor 90 may omit the inner cylinder 92.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A permanent magnet electrical machine, comprising:
   a rotor including a first magnet having a first surface, a second magnet having a second surface, and a retention element having third and fourth surfaces, wherein an axial relative force maintained between the first and second magnets urges the third and fourth surfaces along the first and second surfaces respectively to induce a hoop stress in the retention element and compressive stresses within the first and second magnets;
   a stator including a stator duct axially aligned with the retention element; and
   a sleeve disposed circumferentially around the first and second magnets and the retention element.

2. The electrical machine of claim 1, wherein the first and second surfaces are frustoconical surfaces proximate peripheral regions of the respective first and second magnets.

3. The electrical machine of claim 2, wherein the third and fourth surfaces of the retention element comprise a pair of opposed frustoconical inner surfaces.

4. The electrical machine of claim 2, wherein each of the first and second magnets includes a substantially cylindrical inner surface.

5. The electrical machine of claim 1, wherein:
   the retention element is a first retention element;
   the rotor comprises second and third retention elements;
   the first magnet has a fifth surface, the second magnet has a sixth surface;
   the axial relative force is maintained between the first and second magnets and the first, second and third retention elements; and
   the axial relative force urges the second and third retention elements along the fifth and sixth surfaces respectively to induce a hoop stress in the second and third retention elements and the compressive stresses within the first and second magnets.

6. The electrical machine of claim 5, wherein the first and fifth surfaces are opposed at least partially frustoconical outer surfaces on the first magnet and the second and sixth surfaces are opposed at least partially frustoconical outer surfaces on the second magnet.

7. The electrical machine of claim 6, wherein each of the third and fourth surfaces comprise an at least partially frustoconical inner surface on the first retention element, and each of the second and third retention elements comprise an at least partially frustoconical inner surface.

8. The electrical machine of claim 1, further including a first end member and a second end member, the first and second end members positioned on opposing sides of an assembly comprising at least the first and second magnets and the retention element, the sleeve structured to extend beyond both the first end member and the second end member, wherein portions of the sleeve extending beyond the first and second end members are structured to form a rotor shaft of the rotor.

9. A permanent magnet electrical machine, comprising:
   a rotor including at least one magnet having a pair of opposed engaging surfaces, at least two retention elements, wherein each of the retention elements is engaged with one of the opposed engaging surfaces of the at least one magnet, and a pair of opposed end members configured to maintain an axial force between the at least one magnet and the at least two retention elements, wherein the axial force urges each of the retention elements along the one of the opposed engaging surfaces to induce a hoop stress in each of the retention elements and a compressive stress within the at least one magnet;
   a sleeve disposed circumferentially around at least one of the at least two magnets and at least one of the at least two retention elements; and
   a stator including a stator duct axially aligned with one of the retention elements, the stator duct positioned to reduce variation in flux density along the at least one magnet and the at least two retention elements.

10. The rotor of claim 9, comprising N magnets and N+1 retention elements.

11. The rotor of claim 9, wherein the at least one magnet comprises at least two magnets, wherein at least one of the retention elements is engaged with one of the engaging surfaces of the at least two magnets.

12. The rotor of claim 11, further including a first end member and a second end member, the first and second end members positioned on opposing sides of an assembly comprising at least the one magnet and the at least two retention elements, the sleeve structured to extend beyond both the first end member and the second end member, wherein portions of the sleeve extending beyond the first and second end members are structured to form a rotor shaft of the rotor.

13. The rotor of claim 11, comprising a shaft, wherein the at least two magnets are disposed along the shaft.

14. The rotor of claim 9, wherein the opposed engaging surfaces are at least partially frustoconical.

15. The rotor of claim 14, wherein the at least one magnet includes a substantially cylindrical inner surface.

16. The rotor of claim 14, wherein at least one of the retention elements includes at least one frustoconical inner surface configured to engage one of the engaging surfaces on the at least one magnet.

17. The rotor of claim 14, wherein the at least one magnet comprises at least two magnets, wherein at least one of the retention elements includes a pair of opposed frustoconical inner surfaces configured to engage one of the engaging surfaces on each of a pair of adjacent magnets of the at least two magnets.

18. A method for constructing a permanent magnet electrical machine, comprising:
arranging a plurality of magnets wherein each of the magnets includes an engaging surface, and a plurality of retention elements along an axis and within a sleeve, the sleeve being disposed circumferentially around the plurality of magnets and the plurality of retention elements, wherein at least some of the plurality of retention elements are disposed at least partially between adjacent magnets; and
axially compressing the magnets and retention elements to induce a hoop stress in each of the retention elements and a compressive stress within each of the magnets, and to urge one of the retention elements along the engaging surface of at least one of the magnets and;
inserting the magnets and retention elements into a stator having at least one stator duct, and;
aligning at least one of the retention elements with a respective one of the at least one stator duct, the at least one stator duct positioned to reduce variation in flux density along the arranged plurality of magnets and plurality of retention elements.

\* \* \* \* \*